(12) United States Patent
Livescu et al.

(10) Patent No.: US 10,280,729 B2
(45) Date of Patent: May 7, 2019

(54) ENERGY INDUSTRY OPERATION PREDICTION AND ANALYSIS BASED ON DOWNHOLE CONDITIONS

(71) Applicants: Silviu Livescu, Calgary (CA); William A. H. Aitken, Calgary (CA)

(72) Inventors: Silviu Livescu, Calgary (CA); William A. H. Aitken, Calgary (CA)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 619 days.

(21) Appl. No.: 14/695,935

(22) Filed: Apr. 24, 2015

(65) Prior Publication Data

US 2016/0314420 A1 Oct. 27, 2016

(51) Int. Cl.
*E21B 44/00* (2006.01)
*G06Q 10/06* (2012.01)
(Continued)

(52) U.S. Cl.
CPC .............. *E21B 44/00* (2013.01); *E21B 10/00* (2013.01); *F04B 49/065* (2013.01); *G01H 1/003* (2013.01);
(Continued)

(58) Field of Classification Search
None
See application file for complete search history.

(56) References Cited

U.S. PATENT DOCUMENTS

| 4,304,300 A | 12/1981 | Watson | |
| 6,131,673 A * | 10/2000 | Goldman | E21B 12/02 175/39 |

(Continued)

FOREIGN PATENT DOCUMENTS

| CA | 2235134 | 5/1997 |
| RU | 2515109 C2 | 4/2012 |

(Continued)

OTHER PUBLICATIONS

Castro, et al., "Overcoming Extended-Reach Challenges for Annular Fracturing", SPE-1736383-MS, SPE/ICoTA Coiled Tubing & Well Intervention Conference, The Woodlands, TX, USA; Mar. 24-25, 2015, pp. 1-19.

(Continued)

*Primary Examiner* — Gurkanwaljit Singh
(74) *Attorney, Agent, or Firm* — Cantor Colburn LLP

(57) ABSTRACT

A method of planning and/or performing an energy industry operation includes estimating variable coefficient of friction (CoF) functions defining the variation of a CoF as a function of a downhole condition dependent on a selected operational parameter of an energy industry operation, the operation including deploying a downhole component configured to perform the operation, each variable CoF function associated with a different value of the selected operational parameter. The method also includes defining a plurality of operational parameters related to the energy industry operation, including choosing a value of the selected operational parameter, and generating a mathematical model of the operation, the mathematical model describing frictional forces on the carrier based on the plurality of operational parameters, the chosen value of the selected operational parameter and the downhole condition, where generating the model includes calculating the CoF based on the variable CoF function associated with the chosen value.

18 Claims, 8 Drawing Sheets

(51) Int. Cl.
  *G06Q 50/06* (2012.01)
  *G01H 1/00* (2006.01)
  *G01M 13/00* (2019.01)
  *F04B 49/06* (2006.01)
  *E21B 10/00* (2006.01)

(52) U.S. Cl.
  CPC ...... *G01M 13/00* (2013.01); *G06Q 10/06313* (2013.01); *G06Q 50/06* (2013.01); *Y04S 10/54* (2013.01)

(56) References Cited

U.S. PATENT DOCUMENTS

| | | | |
|---|---|---|---|
| 6,607,607 B2 | 8/2003 | Walker et al. | |
| 6,923,871 B2 | 8/2005 | Walker et al. | |
| 6,982,008 B2 | 1/2006 | Walker et al. | |
| 7,860,696 B2* | 12/2010 | Chen | E21B 7/04 703/10 |
| 8,036,829 B2* | 10/2011 | Gibbs | F04B 49/065 702/187 |
| 8,800,650 B2* | 8/2014 | Spray | E21B 17/00 166/207 |
| 9,249,654 B2* | 2/2016 | Strachan | E21B 44/00 |
| 9,696,198 B2* | 7/2017 | Turner | G01H 1/003 |
| 2005/0230116 A1 | 10/2005 | Eoff et al. | |
| 2009/0152005 A1 | 6/2009 | Chapman et al. | |
| 2010/0033344 A1 | 2/2010 | Rozenblit et al. | |
| 2011/0077922 A1 | 3/2011 | Moncorge et al. | |
| 2011/0094746 A1 | 4/2011 | Allison et al. | |
| 2011/0153296 A1 | 6/2011 | Sadlier et al. | |
| 2013/0127900 A1 | 5/2013 | Pena et al. | |
| 2013/0132050 A1 | 5/2013 | Parry et al. | |
| 2014/0238670 A1 | 8/2014 | Pop et al. | |
| 2016/0160627 A1 | 6/2016 | Aitken | |

FOREIGN PATENT DOCUMENTS

| | | |
|---|---|---|
| WO | 2009111324 A1 | 9/2009 |
| WO | 2010039342 A1 | 8/2010 |

OTHER PUBLICATIONS

Gravadal, et al., "Tuning of Computer Model Parameters in Managed-Pressure Drilling Applications Using an Unscented-Kalman-Filter Technique", SPE 97028, SPE Annual Tehcnical Conference & Exhibition, Dallas, Oct. 9-12, 2005, 11 pages.

Livescu, et al., "Challenging the Industry's Understanding of the Mechanical Friction Reduction for Coiled Tubing Operations", SPE-170636, SPE Annual Technical Conference and Exhibition held in Amsterdam, The Netherlands; Oct. 27-29, 2014; pp. 1-17.

Livescu, et al., "Increasing Lubricity of Downhole Fluids for Coiled-Tubing Operations", SOE168298, SPE/ICoTA Coiled Tubing and Well INtervnetion Conference, The Woodlands, TX, USA; Mar. 25-26, 2014; pp. 1-9.

Notification of Transmittal of the International Search Report and the Written Opinion of the International Searching Authority, or the Declaration; PCTUS2015/058901; Jan. 28, 2016;11 pages.

Livescu, et al.; "Analytical Downhole Temperature Model for Tuning Operations"; SPE168299; 2014; Society of Petroleum Engineers; 17 pages.

Livescu, et al.; "Water Hammer Modeling in Extended Reach Wells"; SPE168297; 2014; Society of Petroleum Engineers; 14 pages.

\* cited by examiner

ENERGY INDUSTRY OPERATION PREDICTION AND ANALYSIS BASED ON DOWNHOLE CONDITIONS

BACKGROUND

Hydrocarbon exploration and energy industries employ various systems and operations to accomplish activities including drilling, formation evaluation, stimulation and production. Coiled tubing (CT) operations are employed by the energy industry to accomplish various tasks, including well interventions, production, stimulation, and drilling. Designing an effective CT operation often involves modeling downhole conditions such as downhole forces and flow properties to select and attempt to optimize operational parameters.

SUMMARY

An embodiment of a method of planning and/or performing an energy industry operation includes estimating a plurality of variable coefficient of friction (CoF) functions defining the variation of a CoF as a function of a downhole condition dependent on a selected operational parameter of an energy industry operation, the operation including deploying a carrier in a borehole in an earth formation, the carrier including a downhole component configured to perform the operation, each variable CoF function associated with a different value of the selected operational parameter. The method also includes defining a plurality of operational parameters related to the energy industry operation, including choosing a value of the selected operational parameter, and generating a mathematical model of the operation, the mathematical model describing frictional forces on the carrier based on the plurality of operational parameters, the chosen value of the selected operational parameter and the downhole condition, where generating the model includes calculating the CoF based on the variable CoF function associated with the chosen value.

An embodiment of a system for planning and/or performing an energy industry operation includes a carrier configured to be disposed in a borehole in an earth formation, the carrier including a downhole component configured to perform the operation based on a plurality of operational parameters, and at least one sensing device configured to measure a downhole condition during the operation. The system also includes a processor configured to receive a plurality of defined operational parameters related to an energy industry operation, the plurality of operational parameters including a chosen value of a selected operational parameter. The processor is configured to perform: estimating a plurality of variable coefficient of friction (CoF) functions defining the variation of a CoF as a function of a downhole condition dependent on the selected operational parameter of an energy industry operation, each variable CoF function associated with a different value of the selected operational parameter; and generating a mathematical model of the operation, the mathematical model describing frictional forces on the carrier based on the plurality of operational parameters, the chosen value of the selected operational parameter and the downhole condition, wherein generating the model includes calculating the CoF based on the variable CoF function associated with the chosen value.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
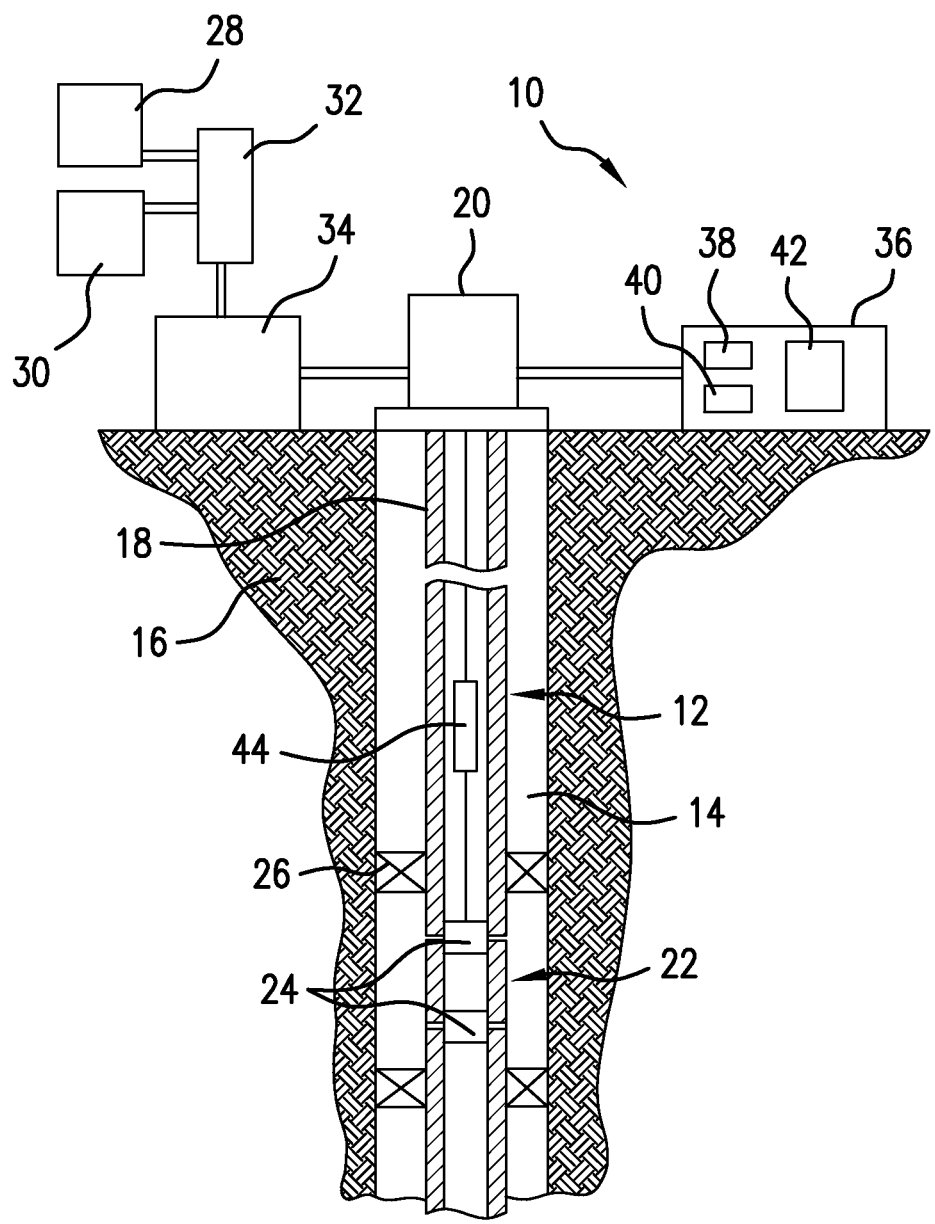
FIG. 1 depicts and embodiment of a well intervention, production and/or measurement system.

The systems and methods described herein provide for modelling downhole conditions and operations, and for planning and performing energy industry operations such as coiled tubing (CT) operations. A mathematical model of operational parameters and downhole conditions is generated during the planning stages of an operation to determine operational restrictions and plan the operation. In one embodiment, the model is used during the operation for monitoring the operation and adjusting operational parameters, and may be updated in real time during the operation based measurements of downhole conditions.

Generating and/or updating the model includes calculating and inputting a variable coefficient of friction (CoF) to a processor or algorithm for use in modelling the operation. The coefficient is estimated based on calculated relationships or functions that describe the change or variation of the CoF in response to changes in downhole conditions. The downhole conditions may represent downhole measurements of conditions (e.g., pressure, temperature, vibration and others), surface measurements of conditions (e.g., pressure, injection fluid flow rate and properties, produced fluid properties, deployment or tripping speed, and others), and/or expected conditions based on planned or actual operational parameters.

In one embodiment, the model is generated during a planning stage in which expected operational parameters and downhole conditions are input to the model. The model, in one embodiment, includes a force model such as a tensile force analysis (TFA) model, which estimate or predicts forces on various downhole components based on planned or actual operational parameters (e.g., CT size, injection fluid properties, injector type, borehole and carrier geometry, type and concentration of various chemicals, pumping rate and CT speed) and expected or measured downhole conditions (e.g., temperature, pressure, flow rate, borehole fluid composition and others). Generating the model includes calculating a value or values of the CoF specifically for the operation based on the variable CoF functions. During an operation, various measurements are performed, which can be taken at the surface and/or downhole. In one embodiment, these measurements are received and applied to the model in real time. Changes in downhole conditions are applied to the relevant functions and the CoF for the model is re-calculated and input to the model. The CoF is variable in that the CoF may change in response to changes in downhole conditions. The variability of the CoF may be temporal and/or spatial, in that the CoF may change for a specific location or component over time and/or may change based on location or depth.

The systems and methods described herein allow for accurate modeling of boreholes, formations and/or operations by accounting for changes in downhole conditions and incorporating more accurate estimations of frictional forces based on local downhole conditions. Other techniques have not considered this variability of the CoF in CT numerical models, leading to significant differences between different simulations and uncertainty in the accuracy of models. Default CoFs that are input to current models of CT operations are constant CoFs that are based on knowledge from similar wells. These CoFs may be different depending on available knowledge and assumptions. For instance, the default CoF that is input in current pre-job simulations for cased holes, when no lubricant or friction reducing tools such as fluid hammer tools and tractors are used, typically can vary between 0.24 and 0.30 or even higher. This makes it extremely difficult to consistently evaluate and compare the friction reducing effects of lubricants, fluid hammer tools, and tractors in extended-reach wells. Embodiments described herein address such disadvantages.

The descriptions provided herein are applicable to various oil and gas or energy industry data activities or operations. Although embodiments herein are described in the context of well interventions and coiled tubing operations performed in existing boreholes, they are not so limited. The embodiments may be applied to any energy industry operation for which frictional force analyses are relevant. Examples of energy industry operations include drilling (e.g., using a drill string or coiled tubing), reservoir navigation, surface or subsurface measurement and modeling, reservoir characterization and modeling, formation evaluation (e.g., pore pressure, lithology, fracture identification, etc.), stimulation (e.g., hydraulic fracturing, acid stimulation), completion and production.

Referring to FIG. 1, an exemplary embodiment of a well intervention, production and/or measurement system 10 includes a borehole string 12 configured to be disposed in a borehole 14 that penetrates at least one earth formation 16. The borehole 14 may be an open hole, a cased hole or a partially cased hole. Although the borehole 14 is shown in FIG. 1 to be a vertical hole of constant diameter, the borehole is not so limited. For example, the borehole 14 may be of varying diameter and/or direction (e.g., azimuth and inclination), e.g., include a horizontal or lateral section. In one embodiment, the borehole string 12 is an injection or stimulation string that includes a tubular 18 such as coiled tubing, that extends from a wellhead 20 at a surface location (e.g., at a drill site or offshore stimulation vessel). The tubular may include other components, such as a pipe (e.g., multiple pipe segments), wired pipe or wireline.

The system 10 includes one or more injection and/or production assemblies 22 configured to control injection of stimulation fluid and direct stimulation fluid into one or more production zones in the formation, and/or facilitate production of hydrocarbons from the formation 16. For example, each assembly 22 includes one or more injection or flow control devices 24 configured to direct stimulation fluid from a conduit in the tubular 18 to the borehole 14. Examples of flow control devices 24 include downhole pumps, injection and/or production valves, jetting nozzles, fracturing sleeves, and combinations thereof. The assemblies may be incorporated as a bottomhole assembly (BHA) and/or positioned at various locations along the borehole string 12.

As used herein, the term "fluid" or "fluids" includes liquids, gases, hydrocarbons, multi-phase fluids, mixtures of two or more fluids, water and fluids injected from the surface, such as water or stimulation fluids. For example, the fluid may be a slurry that includes fracturing or stimulation fluids and/or sand/proppants. In another example, the fluid is a stimulation fluid such as an acid or chemical stimulation fluid or cleanout fluid.

Other components that may be incorporated include perforations in the casing and/or borehole, and packers 26, which are typically conveyed downhole and activated to expand when it reaches a selected depth to seal the borehole and create isolated regions. Multiple openings and packers can be disposed at multiple depths to create a plurality of isolated regions or zones.

Various surface devices and systems can be included at surface locations. For example, a fluid storage unit 28, a proppant storage unit 30, a mixing unit 32, and a pump or injection unit 34 are connected to the wellhead 20 for providing fluid to the borehole string 12 or a string/completion annulus for operations such as a fracturing operation, a stimulation operation, a cleanout operation and others.

Various measurement tools may also be incorporated into the system 10 to affect measurement regimes such as wireline measurement applications, measurements in conjunction with coiled tubing operations, or logging-while-drilling (LWD) applications. For example, one or more downhole components include sensor devices configured to measure various parameters of the formation and/or borehole. For example, one or more parameter sensors are incorporated into the coiled tubing, BHA and/or measurement tools. Sensors may also be incorporated into a casing (e.g., as a permanent downhole gauge). The sensors are configured for measurements relating to the formation, borehole, geophysical characteristics and/or borehole fluids. These sensors may include formation evaluation sensors (e.g., resistivity, dielectric constant, water saturation, porosity, density and permeability), sensors for measuring geophysical parameters (e.g., acoustic velocity and acoustic travel time), sensors for measuring borehole fluid parameters (e.g., viscosity, density, clarity, rheology, pH level, and gas, oil and water contents) and sensors for borehole pressure and/or flow rate (e.g., distributed pressure sensors) and temperature (e.g., distributed temperature sensors).

The system 10 also includes a surface processing unit such as a control unit 36, which typically includes a processor 38, one or more computer programs 40 for executing instructions, and a storage device 42. The control unit 36 receives signals from downhole sensors and surface devices such as the mixing unit 32 and the pump unit 34, and controls the surface devices to obtain a selected parameter of the fluid at a downhole location. Functions such as sensing and control functions may not be exclusively performed by the surface controller 36. For example, a downhole electronics unit 44 is connected to downhole sensors and devices and performs functions such as controlling downhole devices, receiving sensor data and communication, and communicating with the controller 66.

In one embodiment, sensor devices 24 are configured to communicate with one or more processors, such as the downhole electronics unit 44 and/or a surface controller 36. The processor(s) may receive data and communication signals from the downhole components and/or transmit control signals to the components. Signals and data may be transmitted via any suitable transmission device or system, such as a cable. Other techniques used to transmit signals and data include wired pipe, electric and/or fiber optic connections, mud pulse, electromagnetic and acoustic telemetry.

Figure 2:
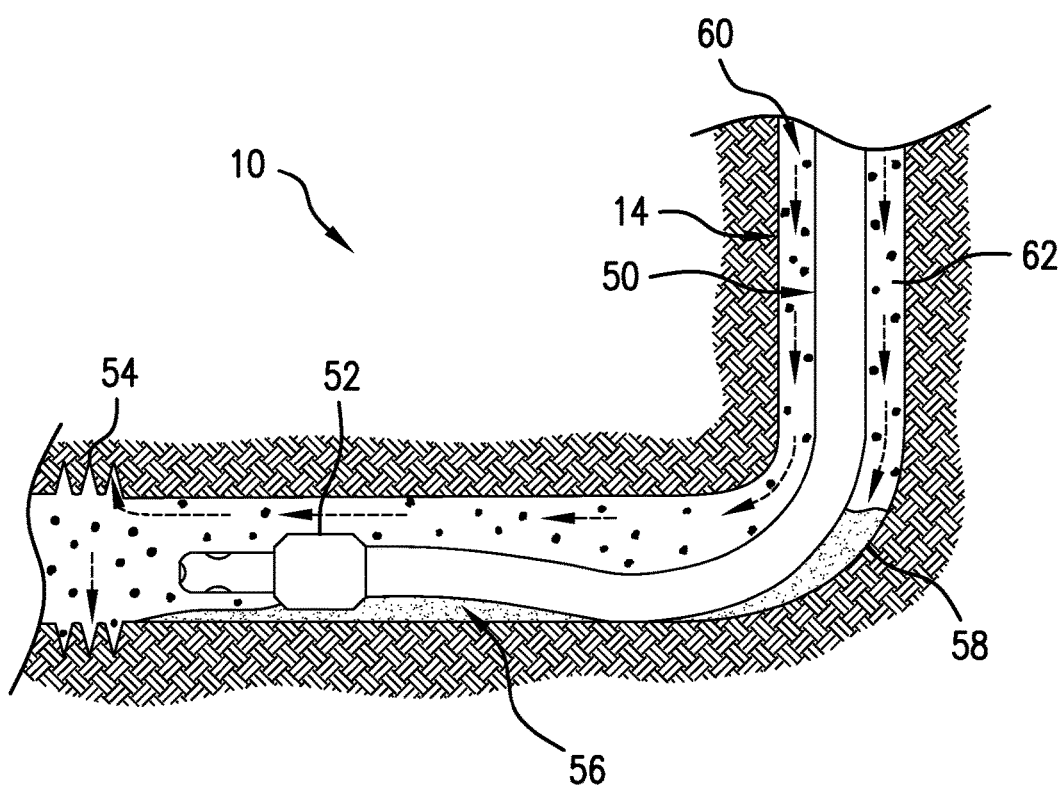
FIG. 2 depicts an embodiment of a coiled tubing system.

An example of a BHA or flow control device 24 is shown in FIG. 2. A coiled tubing 50 can be extended into the borehole 14 as the borehole string or in the borehole string 12. A horizontal portion of the tubing 50 extends into a horizontal wellbore section. The term "horizontal wellbore" refers to horizontal or highly deviated wells as understood in the art. A BHA 52 is connected to the end of the coiled tubing 50 via a connector such as, for example, a "grapple" connector. Although the BHA 52 may take a variety of forms, the BHA 52 in this example includes a sand jet perforating tool equipped for reverse circulation. The sand jetting tool of the BHA 52 can be utilized to create perforations 54. In an exemplary fracturing operation, a sand jet perforation tool is used which will create a proppant bed 56. This proppant bed maybe circulated back to position 58. A fracturing slurry 60 is pumped down annulus 62, after the fracturing process a proppant bed may remain with the tubing 50. If this bed prevents the coiled tubing reaching the next perforation interval it can be cleaned out. If not, the bed can be made to be part of a sand plug.

Successful well intervention operations in extended reach wells rely on the coiled tubing's ability to reach the bottom of the well with enough weight on bit (WOB) for specific applications. As horizontal wells are drilled longer than ever, well intervention operations are limited by the performance of mechanical friction technologies such as lubricants, fluid hammer tools, and tractors, to help the coiled tubing string (also referred to as the "CT") deliver the required WOB at the desired depth. For instance, there are numerous long horizontal wells, i.e., wells with laterals between 12,000 and 25,000 feet, in the North Sea that cannot be serviced with the current extended reach technologies. While increasing the CT diameter is one option to improve reach, commonly it is not possible to bring a larger CT to a location, or the completion is too small. Other technologies, such as fluid hammer tools and tractors may be an option for servicing long laterals.

The simplest solution is the use of lubricants. Lubricants are used extensively for well intervention operations. However, their field performance is highly misunderstood and is generally based on anecdotal case histories presented within the industry that lack strong scientific fundamentals. An increasingly in-depth understanding of CT friction phenomena can help to increase the lateral reach significantly and allow for optimization of job parameters in real-time. Various other solutions such as fluid hammer or tractor tools may be used instead of or in conjunction with lubricants.

The systems described herein are equipped with a processor or processors (e.g., processing units 36 and/or 44) that are configured to receive downhole and/or surface data, and generate, adjust and/or update a simulation model that can be used to monitor and/or control operations. The simulation model may be used in real time during the operation, for example, by tuning the model based on real time measurements. The model may be generated prior to an operation (e.g., during pre-planning) by estimating local downhole conditions based on planned operational parameters and known or assumed formation properties. The model may also be used subsequent to the operation, for example, by tuning the model based on measurements taken during the operation to enhance future operations.

In one embodiment, a processor utilizes a quantitative (mathematical and/or numerical) method that models forces on a carrier or downhole components, and is used to estimate or predict conditions and/or parameters during an operation. For example, for a coiled tubing operation, the processor models conditions and parameters such as temperature and pressure downhole, fluid flow rate, rate of penetration, RPM, and others as a function of time. In one embodiment, the simulation model is generated using software such as a tensile force analysis (TFA) software package (e.g., CIRCA Coiled Tubing Simulation software by Baker Hughes, Inc.), which is used to achieve predictable and efficient CT operations. Inputs to the model include a description of a borehole string (e.g., string material and makeup), fluid types, rates and pressures in the string and in the borehole. Other parameters such as temperatures and contact surface roughness may be used.

A certain parameter, the coefficient of friction (CoF), is paramount in predicting operating parameters for a specific CT operation, such as the available force at the bottomhole assembly (BHA) and the maximum depth that can be reached. The software, systems and methods described herein provide estimations or predictions of downhole forces based on a variable CoF that may be calculated during operation planning and/or in real time (or periodically, or after an operation for analysis). Calculation of the CoF is performed specifically for a planned or current operation and can be adjusted during the operation in response to changing conditions. This more accurate calculation of the CoF can lead to the optimization of operational parameters such as the CT size, injector type, BHA geometry, the type and volume of chemicals, the pumping rate and CT speed schedule used for job design.

The model estimates or predicts downhole conditions based on modelled fluid forces, including radial forces, drag forces, pressure forces, and temperature effects on the friction forces. The model incorporates a variable CoF that varies as a function of downhole parameters or conditions. In one embodiment, the model incorporates or utilizes functions or mathematical relationships that describe the variable CoF as a function of local downhole conditions such as downhole temperatures, pressures, fluid flow rates and fluid chemistry (e.g., composition of injection fluid, fluid produced from a formation (production fluid), fracturing fluid and others). As described herein, "local" refers to conditions occurring at or near the location of a component (e.g., BHA, tool or tubing section) for which frictional forces are to be modeled. This is in contrast to, e.g., assuming a constant value or function for the entire borehole or large section where conditions may be different, or calculating frictional forces based on pre-existing data from similar wells or operations.

It has been discovered that CoFs depend locally on many downhole conditions such as temperature, pressure, fluid type and composition, contact surface (CT and well) roughness, lubricant amount, end forces and flow rate. The models and methods described herein account for CoFs that vary with downhole conditions by calculating and/or utilizing mathematical functions that describe the relationship between CoFs and changing downhole conditions. The CoF may also be calculated as a function of well deviation complexity, production rates, and CT sliding direction. The CoF is thus more accurately estimated during both running into the hole (RIH) and pulling out of the hole (POOH).

In one embodiment, the model estimates or predicts mechanical or contact friction coefficients based on the interaction of surfaces in relative motion. The science of mechanical friction between two solids is referred to as tribology. The relationship between the friction force ($F_f$) and the normal load applied to the two bodies in contact (N) is provided by the coefficient of friction (CoF), which is represented by the symbol $\mu$ and the relationship $\mu=F_f/N$. For wet friction, the CoF is dependent on many factors, such as temperature, applied load, contact surface roughness, sliding speed, humidity and fluid viscosity. For dry friction, the Coulomb's friction model is $\mu \leq F_f/N$, where the friction force $F_f$ can take any value between zero (for static friction, when the bodies in contact do not move relative to each other) and $\mu N$ (for dynamic friction, when the bodies in contact have relative motion to each other). An understanding of the wet dynamic friction of borehole strings under downhole conditions is important especially for long lateral wells that are increasingly being drilled. In order to reach long laterals (e.g., greater than 6,000 ft long laterals), an accurate understanding of the frictional forces is needed in order to design appropriate lubricants and other parameters.

The CoF may be calculated based on rotational friction and/or sliding friction data. For example, in fracturing, injection, well cleanout and other operations, the coiled tubing (or other borehole string) is primarily advanced axially along the borehole, and the frictional forces are dominated by sliding friction. In other operations, such as drilling operations utilizing a drill string, or coiled tubing drilling operations that utilize a drill bit connected to coiled tubing and a mud motor, the frictional forces include both rotational and sliding friction.

Figure 3:
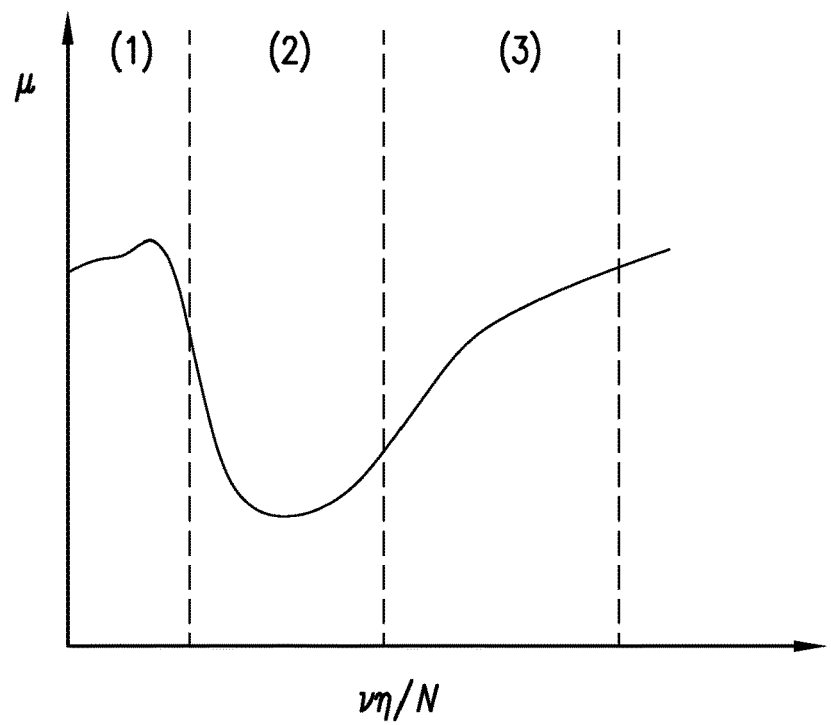
FIG. 3 depicts a curve representing aspects of the friction of hydrodynamic bearings, used in embodiments for calculation of model parameters.

For rotational friction, based on Stribeck's study on the friction of hydrodynamic bearings, the relationship between $\mu$ and $v\eta/N$, where $v$ is the relative velocity between the two solids, $\eta$ is the bulk fluid viscosity, $\mu$ is the CoF and N is the normal load, can be plotted as a single curve, usually called the Stribeck Diagram. This curve, shown in FIG. 3, displays three regions. First, in the boundary friction regime (labeled region 1), $v\eta/N$ is small and $\mu$ is large. During this regime, the two friction surfaces are in contact at asperities, the hydrodynamic effects of the bulk fluid do not significantly influence the mechanical friction, and the interactions between the two contact surfaces and fluid dominate the tribological characteristics. In the elastohydrodynamic friction regime (labeled region 2), $\mu$ decreases, reaches a minimum value, and then starts increasing as $v\eta/N$ increases. In this regime, the thickness of the fluid film is similar to the contact surface roughness and the fluid viscosity is the most dominant factor. Third, in the hydrodynamic friction regime (labeled region 3), $\mu$ continues increasing as $v\eta/N$ increases further. In this regime, the fluid film between the two contact surfaces is thicker than their roughness sum and internal fluid friction alone determines the tribological characteristics.

For sliding friction, a similar curve to the Stribeck Diagram for hydrodynamic bearings can be obtained, which shows that, while $v$ and N usually vary slightly during some CT operations, the downhole fluid viscosity $\eta$ may vary significantly. For instance, the viscosity of water at 20 and 100° C. is 1.002 and 0.2822 mPa·s, respectively. Parameters identified to have a significant effect on downhole fluid viscosity and friction regime are temperature, fluid type and chemistry, and contact surface roughness. Other parameters, such as pressure, have a weaker effect of the sliding friction. For instance, increasing the pressure from atmospheric to 12,000 psi results in a CoF variation of approximately 5% for fluids commonly used in coiled tubing operations.

Using the model, various operational parameters can be selected or changed to improve an operation, such as by extending reach, increasing production or stimulation effectiveness and/or reducing operation time. Such parameters include coiled tubing or string diameter, the type of lubricant, fluid hammer and/or tractor tools used, pressure and flow rate.

In general, lubricants are used in CT operations for two main reasons: to reduce the CT friction just enough to achieve the required results (this is sometimes termed operational recovery); and secondly, for pre-job planning use when much greater volumes of lubricant are introduced to contact the complete lateral. In the first case, by far the most common application, slugs of lubricant are pumped downhole to locally reduce CT friction and reach further into the well or to release tubing or tools stuck in hole. In the second case, the CoFs from previous field jobs with lubricants are used in pre-job planning stage to reach further in a lateral, increase push along the lateral or lower pulling weights. Usually, this situation appears when pre-job computer simulation scenarios show that the required total depth (TD) will not be reached and the use of fluid hammer tools or tractors are not practical alternatives. In both situations, it is of high interest to quantify the benefit of using the lubricant by accurately estimating the CoF associated with the lubricant during varying downhole conditions.

In one embodiment, the variable CoF functions are calculated prior to the operation by performing various experimental or laboratory measurements that recreate different downhole conditions associated with operational parameters, and calculate the effect of these conditions on the CoF. Such conditions include temperature, pressure, sliding speed, surface roughness, and fluid composition.

For example, an extensive set of laboratory measurements was performed to estimate the relationship between CoF and downhole conditions. Measurements included linear friction measurements and rotational friction measurements.

Rotational friction testers were used for measuring the CoFs of CT lubricants at atmospheric conditions and applying these values at downhole conditions specific to CT operations. Such testers are capable of simulating the speed of rotation of pipe or drill bits and the pressure with which the pipe or drill bit bears against the wall of the hole. Some testers use a torque steel block that is pressed against a rotating steel ring. Other technologies, such as pin-on-disk or ball-on-disk, are used by other rotational friction testers.

Several in-house laboratory rotational tests with three lubricants (referred to as Lubricants 1, 2 and 3) were performed. Lubricant 1 is a blend of a fatty acid and modified fatty acids. Lubricant 2 is a branched polyoxy ethanediyl blended with surfactants and a phosphate ester. Lubricant 3, a lubricant developed to reduce CT friction at downhole conditions, is a blend of sulfated vegetable oil, surfactants, and mutual solvents. All lubricants readily disperse in water. The CoFs of solutions of 2% of each lubricant mixed in 2% potassium chloride (KCl) brine with 0.1% of a fluid friction reducer at room temperature (20° C.) are presented in the following table (Table 1) with their corresponding field CoFs:

| Lubricant | Rotational CoF at 20° C. | Linear CoF at 98° C. | Field CoF |
| --- | --- | --- | --- |
| None | 0.34 | 0.28 | 0.24-0.28 |
| 2% Lubricant 1 | 0.04 | 0.20 | 0.19 (0.17)-0.24 |
| 2% Lubricant 2 | 0.05 | 0.18 | 0.19 (0.17)-0.24 |
| 2% Lubricant 3 | 0.08 | 0.12 | 0.13-0.14 |

The laboratory rotational CoFs shown in Table 1 were obtained from tests performed at atmospheric conditions using a rotational friction tester. It is noted that this experimental result includes uncertainties reflected by a comparison of the results with field CoFs. For instance, the differences between the rotational and field CoFs are in the range of 76 to 83% for Lubricant 1, 71 to 79% for Lubricant 2, and 38 to 43% for Lubricant 3. Three reasons for the discrepancies between rotational friction and field data have been identified. First, these exemplary laboratory tests performed at surface were designed to mimic the downhole conditions as much as possible. However, additional factors such as temperature and chemical composition of downhole fluids has been found to strongly affect the fluid viscosity. Note that the viscosity of downhole water-based fluids depends strongly on temperature and only weakly on pressure, suggesting that the downhole pressure may have only a small effect of CT friction. Second, the CT and casing contact surfaces are not replicated by the rotational friction testers. Although the typical average roughness for CT and casing surfaces is approximately in the range of less than 1 µm to more than 10 µm and in the range of less than 1 µm to more than 12 µm, the average roughness of the contact surfaces on the rotational friction tester used in this example was approximately 1 µm. Third, laboratory tests using rotational testers do not account for linear sliding movement inside the well.

To account for sliding movement, a linear friction instrument mimicking the CT movement during well intervention operations has been developed to measure the linear or sliding CoFs of lubricants mixed in downhole fluids when operational parameters and/or downhole conditions such as temperature, fluid type and chemistry, and/or contact surface type and roughness are varied.

The linear friction instrument was designed to allow using real CT coupons that could be replaced between experiments in order to avoid excessive wear, using real casing samples or planar metal plates with similar roughness, and varying volumes and concentrations of fluids. The entire CT, casing, and fluid system can be heated using a heating pad located below the metal plate (planar or tubular) on which the CT coupon is sliding. Three thermocouples are used to monitor the temperature of the system and to assure that the temperature of the fluid and the two contact surfaces are similar during each test.

Tests were performed using various lubricants and liquids, different CT/casing grades, gels, surfactants, sand, etc. For each measurement, minimum, maximum, and average CoFs were recorded. The average CT and casing roughness spanned between 0.92 and 10.23 µm and between 0.67 and 12.44 µm, respectively. Linear CoF results for the Lubricants 1, 2 and 3 are shown in Table 1, using 2% KCl brine with 0.1% fluid friction reducer and each lubricant as obtained from lab linear friction tests and field trials (at downhole conditions).

FIGS. 4-7 show examples of laboratory results that can be used to calculate variable CoF functions relative to temperature. In one embodiment, a collection or set of functions is estimated and stored for many different combinations of downhole conditions and/or operational parameters. For example, variable CoF functions are calculated based on a set of experimental measurements of the CoF in response to different simulated temperatures. Each set of experimental measurements is associated with a different value or values of selected operational parameters (e.g., injection fluid type, lubricant type, CT size, CT surface roughness, pumping rate and others). These measurements may be performed in conjunction with field data such as measurements performed during other operations or field trial data, e.g., to verify or adjust experimental measurements.

It is noted that these results are only exemplary and not meant to be limiting. For example, in addition to experimental results using variations of temperature, other results using variations in other conditions and/or parameters can be obtained to generate variable CoF functions relative to other parameters such as pressure, flow rate, fluid composition and chemistry, borehole string dimensions, and others.

Figure 4:
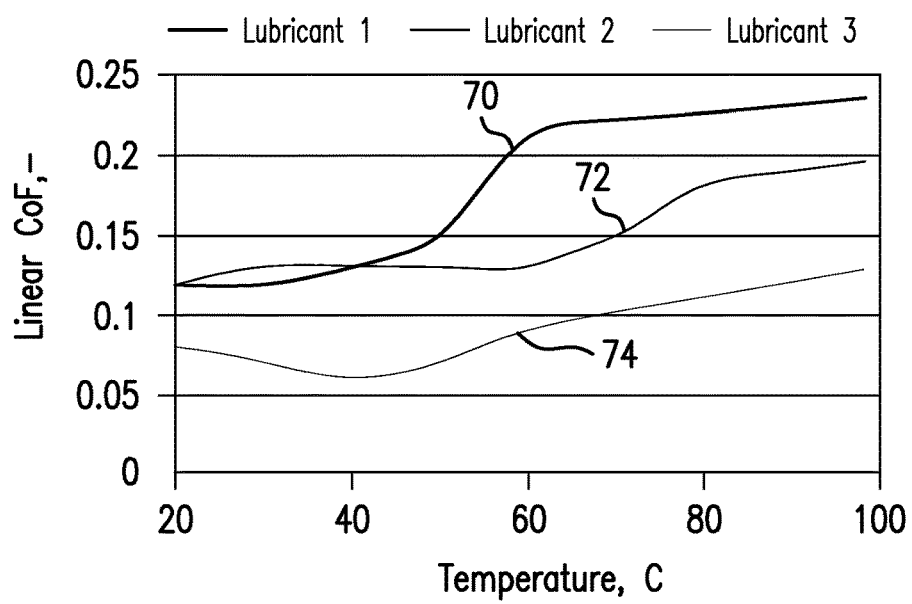
FIG. 4 depicts exemplary experimental data showing the relationship between coefficients of friction (CoF) and changes in temperature for different lubricants in one base fluid.

The results of FIGS. 4-7 show relationships between CoF and temperature for different types of lubricants, fluid compositions and casing types. These results were validated by field data. FIG. 4 shows values of the linear CoF as a function of temperature for solutions of 1% of each lubricant (i.e., Lubricant 1, Lubricant 2, and Lubricant 3) in sea water mixed with 0.1% fluid friction reducer. The change in CoF as a function of temperature is shown for Lubricant 1, 2 and 3, as curves 70, 72 and 74, respectively. These results show that, when mixed in sea water, Lubricant 3 (the best performer) has better friction reduction properties at 98° C. than the other lubricants by as much as 43%.

Figure 5:
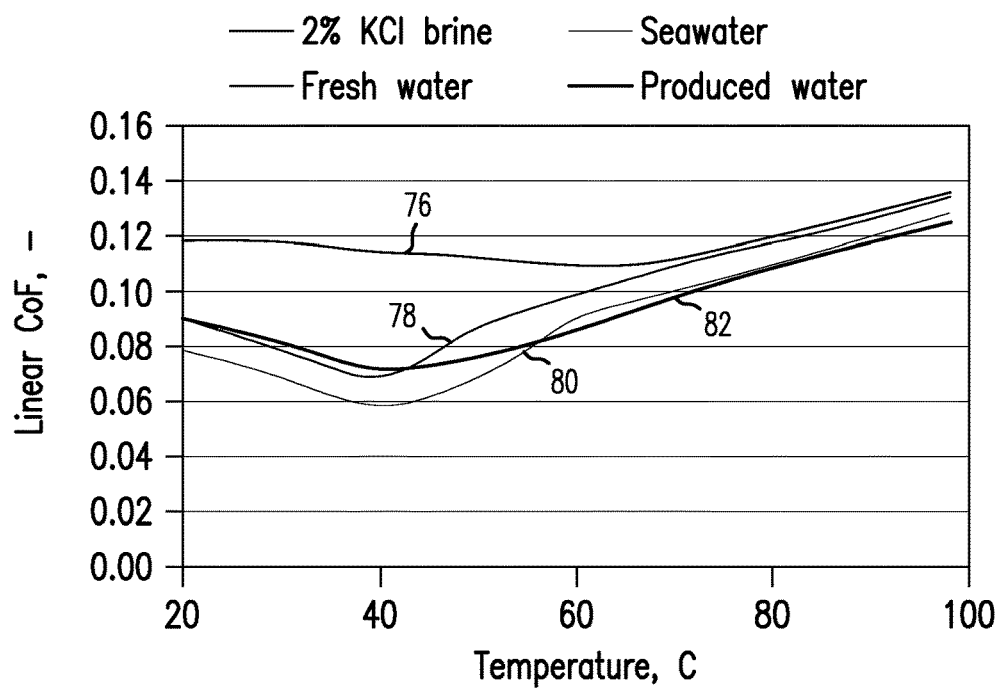
FIG. 5 depicts exemplary experimental data showing the relationship between CoFs and changes in temperature for one lubricant and various base fluids used in injection or borehole fluids.

FIG. 5 shows the temperature dependence of the linear CoF for a solution having a 1% concentration of Lubricant 3 mixed with 0.1% fluid friction reducer in four different base fluids. The base fluids are 2% KCl brine, fresh water, sea water and produced water. The change in CoF as a function of temperature is shown for the brine solution, the fresh water solution, the sea water solution and the produced water solution as curves 76, 78, 80 and 82, respectively. At 98° C., the linear CoF of the produced water solution (0.124) is 8%, 7% and 3% lower, respectively, than those of the 2% KCl brine (0.135), fresh water (0.133), and sea water (0.128) solutions. These results show that even if the base fluid type has a strong effect on friction at low temperature (e.g., the CoF difference between the 2% KCl brine and sea water solutions is almost 50% at 40° C.), the effect is weaker at higher temperatures.

Figure 6:
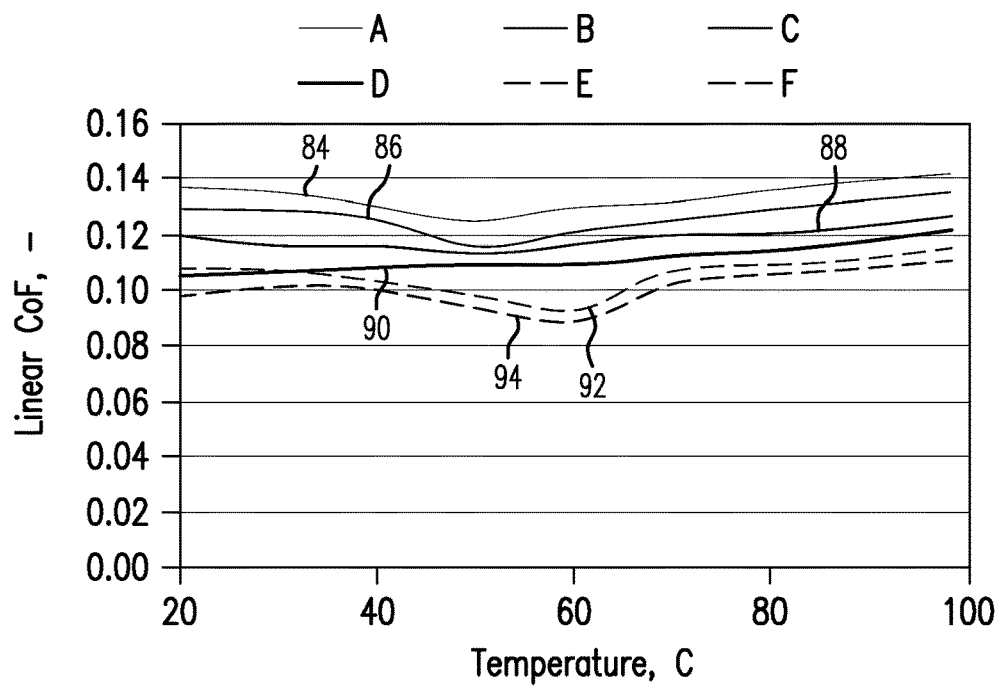
FIG. 6 depicts exemplary experimental data showing the relationship between CoFs and changes in fluid acidity.

FIG. 6 shows the temperature dependence of the linear CoF for different pH solutions having a 1% concentration of Lubricant 3 mixed with base fluids and 0.1% fluid friction reducer. Each of the six base fluids have a different pH; fluid A has a pH of 3.65, fluid B has a pH of 6.00, fluid C has a pH of 7.00, fluid D has a pH of 7.61, fluid E has a pH of 8.88, and fluid F has a pH of 9.50. The change in CoF as a function of temperature is shown for fluids A, B, C, D, E and F as curves 84, 86, 88, 90, 92 and 94, respectively. The main conclusion of this test is that, in general, the lower the pH, the higher the CoF.

The results shown in FIGS. 4-6 indicate that in general, $\mu$ varies with $v\eta/N$ (assuming that $v$ and $N$ are kept constant) in a similar manner to that described by the Stribeck's Diagram for the friction of hydrodynamic bearings. However, in the case of downhole linear CT friction, the corresponding $\mu$ versus $v\eta/N$ curve also depends on the fluid type and chemistry and the contact surface roughness. Other results have supported this important conclusion that challenges the well intervention industry knowledge on the CT friction reduction phenomena.

Figure 7:
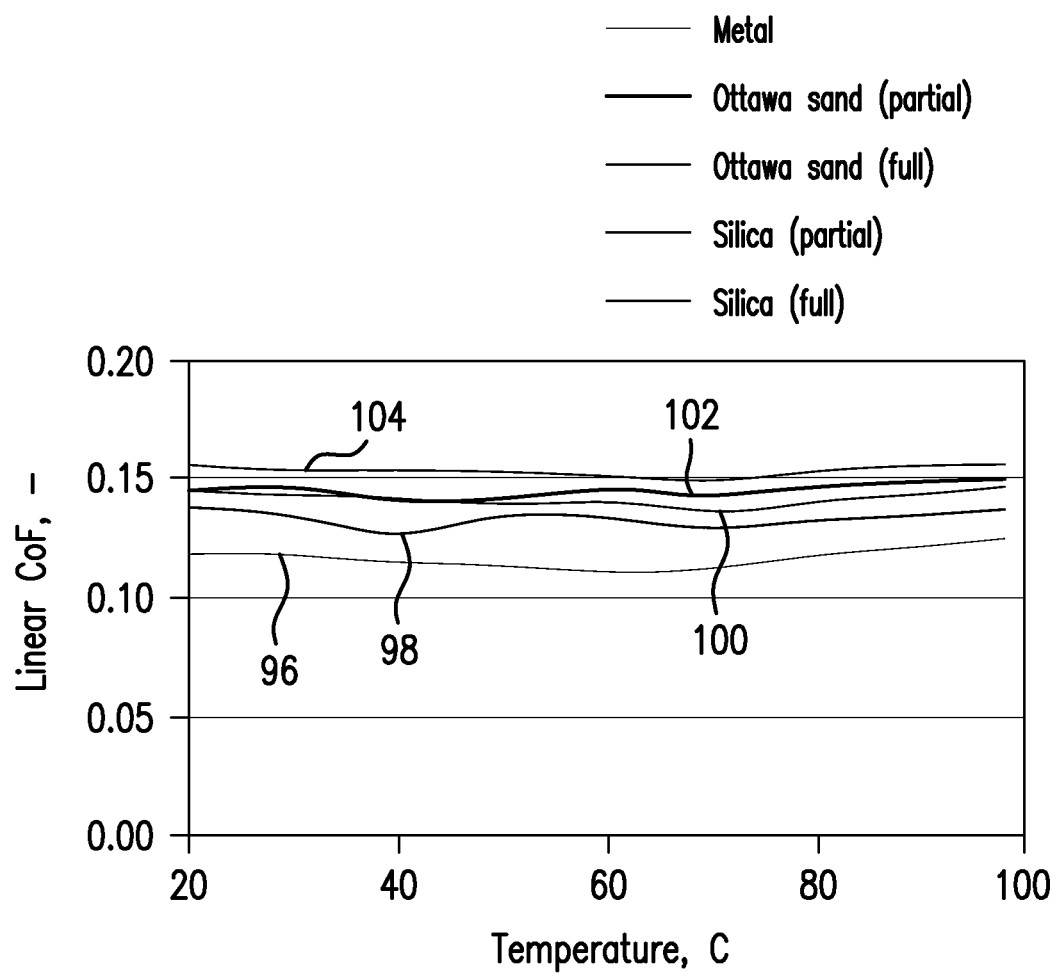
FIG. 7 depicts exemplary experimental data showing the relationship between CoFs and sand type and amount presented in the well.

Other laboratory tests have revealed that the well casing surface type has also an important effect on CT friction. FIG. 7 shows the temperature-dependent linear CoF results for different types of surfaces. In these tests, the fluid was a solution of 1% Lubricant 3 mixed with 2% KCl brine and 0.1% fluid friction reducer. The contact surfaces are a metal plate with average roughness of 12.44 μm (referred to as "Metal"), the metal surface 50% covered with 20/40 Ottawa sand (referred to as "Ottawa sand (partial)"), the metal surface entirely covered with 20/40 Ottawa sand so that there was no metal-on-metal contact (referred to as "Ottawa sand (full)"), the metal surface 50% covered with 20/40 silica (referred to as "Silica (partial)"), and the metal surface entirely covered with 20/40 silica (referred to as "Silica (full)". The silica used in these tests was harder and sharper than the Ottawa sand. The change in CoF as a function of temperature for Metal, Ottawa sand (partial), Ottawa sand (full), Silica (partial) and Silica (full) are shown as curves 96, 98, 100, 102 and 104, respectively. The conclusion of this test is that the CoF increases as Ottawa sand or silica are added to the metal surface.

In one embodiment, experimental results such as those discussed above are analyzed in conjunction with field data from previous operations or field data from field trials. This may be achieved by, e.g., historical post-job matching of observed and experimentally calculated data. This task is significantly easier and far more accurate when used in the planned phase for two reasons. First, steady-state data may be available over a longer lubricated lateral section. Second, it is likely to use the situation when the well is unlubricated as a base case for matching the observed and predicted weights. Thus, the lubricant benefit could be quantified comparing observed and predicted weights during RIH or POOH or both when the well is unlubricated versus when the well is lubricated.

In one embodiment, field data such as RIH and POOH operational results are used to confirm CoFs for operational modelling and to ascertain the benefits when lubricants were utilized. The operational results are acquired by obtaining weight data (i.e., weight of the string) using, e.g., weight gauge readings, during periods of consistent well parameters (e.g., pressure, fluid composition, and/or the presence or absence of lubricant) and obtaining a global CoF by best curve fitting.

Figure 8:
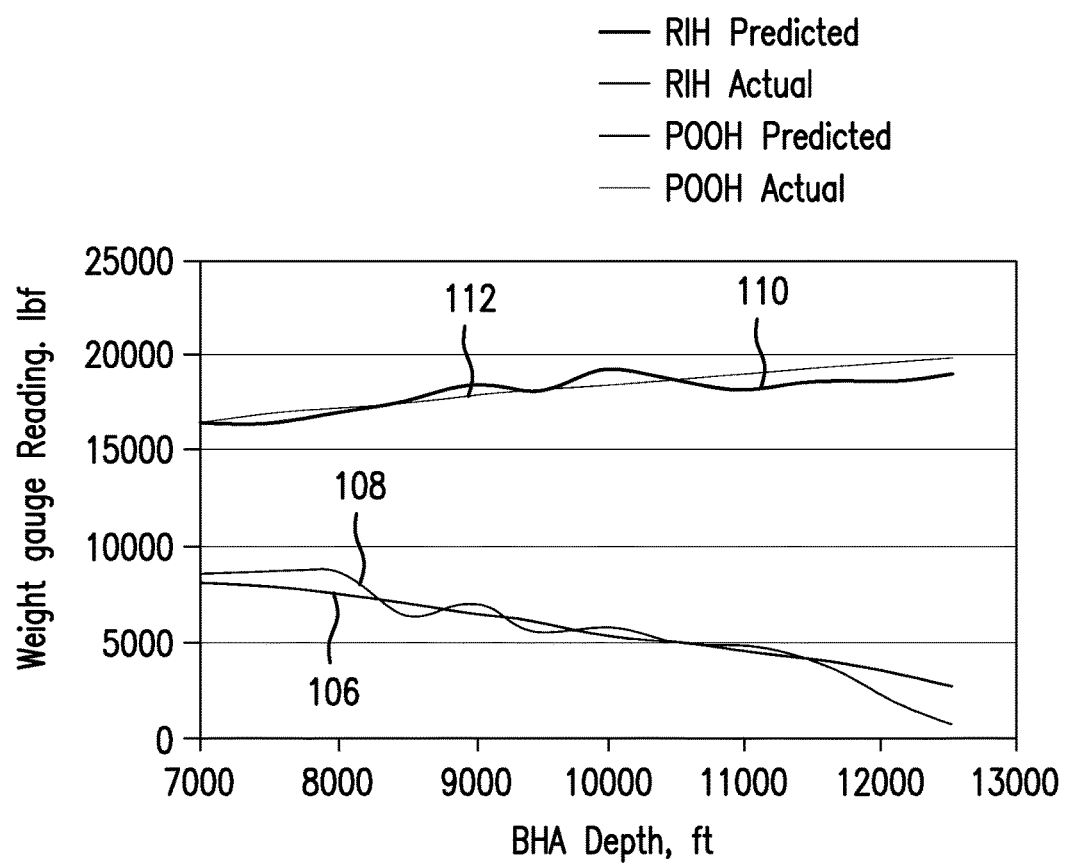
FIG. 8 depicts field data based on measurements of borehole string weight as a function of depth, which can be merged with experimental data to calculate variable CoF functions.
Figure 9:
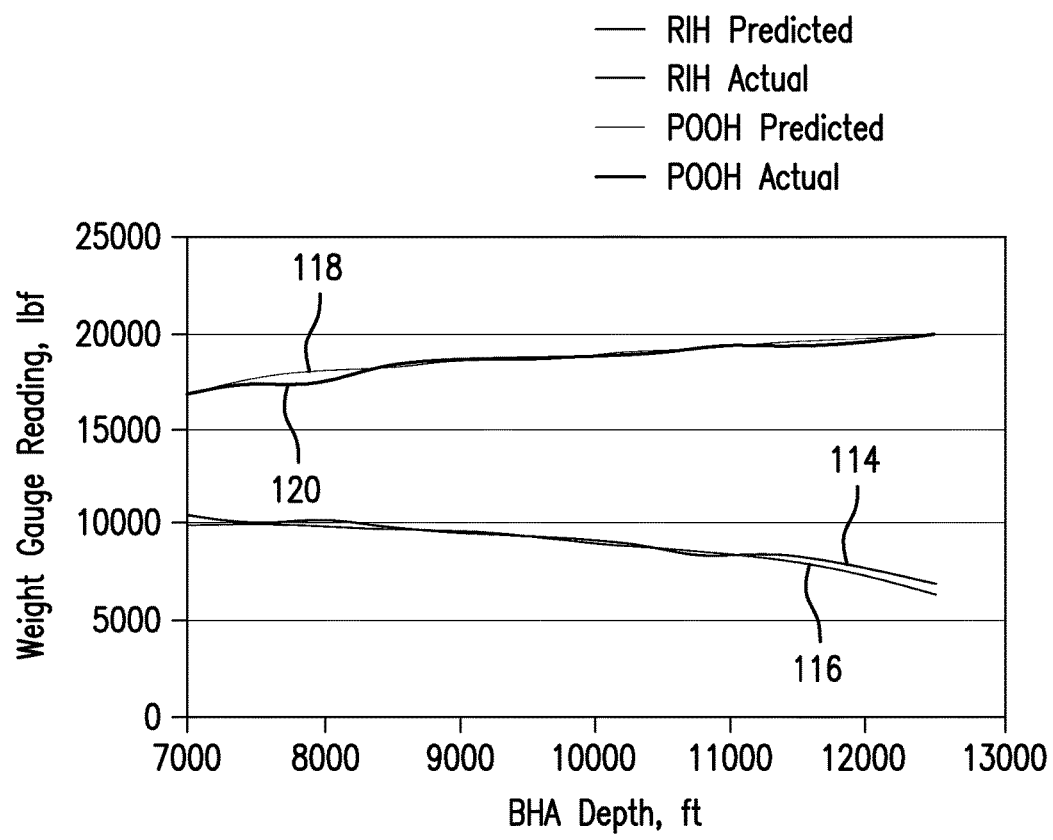
FIG. 9 depicts field data based on measurements of borehole string weight as a function of depth, which can be merged with experimental data to calculate variable CoF functions.

FIGS. 8 and 9 show exemplary results of field trials using this method, which includes calculating a global CoF to compare the benefit of lubricants in operational situations. Very good matching cases during RIH and POOH in lubricated (see FIG. 9) and unlubricated situations (see FIG. 8) are presented for solutions including Lubricant 1, Lubricant 2 and Lubricant 3.

For example, several field trials were conducted with solutions of 2% KCl brine, 1% Lubricant 3, and 0.1% fluid friction reducer. One of the trials was an operation including an annular fracture treatment with diversion achieved by utilizing a CT deployed packer conducted in a 'J shaped' monobore well having an approximately 5,100 ft long lateral section. Previously conducted preparation runs in this well with the use of an extended reach fluid hammer tool revealed a CoF of 0.22 with 1,000 lb-f tensile benefit as illustrated in FIG. 8. A global CoF of 0.22 applied to the model resulted in predicted borehole string weights vs. depth (curves 106 and 110 corresponding to weights during RIH and POOH, respectively) that exhibited good agreement with measurements (curves 108 and 112 corresponding to weights during RIH and POOH, respectively).

When running the CT with a deployment packer for the fracture treatment, Lubricant 3 was introduced at a concentration of 1% with a pump rate of 0.75 bpm, while running in hole at 45 ft/min Post-job weight matching revealed a CoF in the lateral of 0.13. This is a friction reduction of 41% comparing to the case when no lubricant was used. The results of predicted (curves 114 and 118 corresponding to weights during RIH and POOH, respectively) and actual well data (curves 116 and 120 corresponding to weights during RIH and POOH, respectively) when 1% lubricant was added are shown in FIG. 9.

Although the processors described herein are shown in communication with downhole components, they are not so limited. For example, a processor can be embodied as an independent computer or other processing device that can receive input data such as model parameters, measurement information and proposed tripping schedules.

The sensor devices, electronics, tools and other downhole components may be included in or embodied as a BHA, drill string component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include coiled tubing strings, drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

Figure 10:
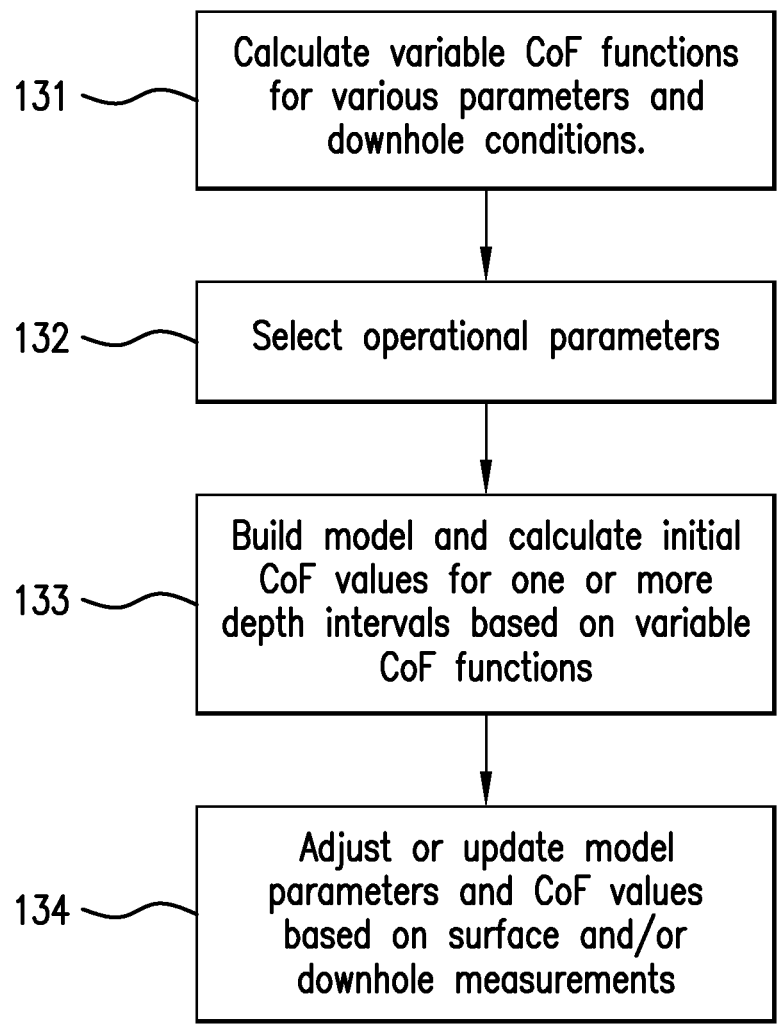
FIG. 10 is a flow chart providing an exemplary method of planning and/or performing an energy industry operation.

FIG. 10 illustrates a method 130 for planning and/or performing an energy industry operation. The method 130 allows operators to model an operation using variable CoF functions, and adjust the model in real time, monitor operational parameters and conditions, and evaluate potential adjustments to the operation. The method also provides an effective way to improve and/or optimize the operation. This method optimizes the job performance, e.g., by allowing for selection and/or adjustment of operational parameters using the model, such as using the correct type and amount of lubricant for the desired reach and WOB required. The method 130 includes one or more of stages 131-134 described herein, at least portions of which may be performed by a processor (e.g., the surface processing unit 36). In one embodiment, the method 130 includes the execution of all of stages 131-134 in the order described. However, certain stages 131-134 may be omitted, stages may be added, or the order of the stages changed.

In one embodiment, the method is performed as specified by an algorithm that allows a processor to automatically adjust or tune an operation model, provide status information and/or control aspects of the operation. The processor as described herein may be a single processor or multiple processors (e.g., a network).

In the first stage 131, functions describing the relationship of CoFs with the variation of one or more operational parameters and/or downhole conditions are calculated. Tables or algebraic formulae may be defined in the software code for the variation of CoF with all or some parameters, such as the operational parameters and conditions specified above. In addition, other downhole parameters such as the CT speed may be considered. In one embodiment, the functions are derived from experimental data (such as the results discussed above) using any suitable mathematical approach such as curve fitting or regression analysis.

In the second stage 132, operational parameters are selected for a planned operation. Exemplary operational parameters include types of fluids, types of lubricants, borehole string (e.g., CT) properties such as materials and dimensions, and expected pressures and flow rates.

For example, a lubricant is selected from a database of fluid compatibility. Specific lubricants may be used if brine, acid, or Diesel are used as base fluids. The selection criteria may include other surfactants, corrosion inhibitors, or fluid friction reducers (for decreasing the fluid pressure drop).

In the third stage 133, a mathematical model of a proposed operation, also referred to as a simulation model, generated or created. This generated model may be referred to as an "initial model", which uses best estimates of the formation and planned operational parameters to predict downhole conditions and frictional forces on a borehole string such as coiled tubing and components in response to the operation. Operational parameters include, for example, tool depth as a function of time, tripping speed or rate of penetration, downhole pressure, downhole temperature, downhole fluid properties, produced fluid properties, and fluid flow rates.

As the model is built, initial values of the CoF are calculated in the background based on the pre-defined tables or algebraic formulae. For instance, when the CT and casing size and materials are defined, the model calculates the minimum amount of lubricant needed to cover all contact surface asperities for the best lubricity and optimized cost.

In one embodiment, after the well trajectory and geothermal gradient are defined, the CT length is discretized in a pre-defined number of segments, each of them having a constant temperature and thus a CoF that is interpolated from the pre-defined tables or calculated from the pre-defined algebraic formula. This discretization provides a local CoF for each discretized depth interval. The method is similar for accounting for all other pre-defined downhole parameters.

In one embodiment, a global CoF is calculated based on, field data as discussed above, and the same global CoF is initially assigned for the operation and/or for each discretized section of the borehole. The CoF may be adjusted in real time or at any other time if operational parameters are changed and/or if downhole conditions change.

In one embodiment, during the pre-planning stage, optimization functions can be used to recommend various operational parameters based on the initial model. For example, depending on the expected pumping rates, reach, and WOB, the optimum CT size and injector force (and thus injector type/capacity) can be recommended.

In the fourth stage 134, the operation is performed, during which the operation is monitored and measurement data is collected. In one embodiment, the measurement data is collected in real time using surface and/or downhole acquisition devices or systems. Surface measurement devices include, e.g., well head pressure sensors, temperature sensors, pump pressure sensors, surface flow rate sensors, and measurement devices for estimating depth of the coiled tubing. Various downhole measurement devices may be incorporated with downhole tools, such as pressure and temperature sensors, strain sensors for measuring strain, vibration and friction (fluid and/or contact friction), flow rate sensors and others. Based on the real time data, the processor may tune the simulation model, monitor the operation and/or provide alerts and other information to a user.

During the operation, downhole conditions and/or operational parameters may change. Measurement data collected during the operation that indicates a change is input to the model and applied to one or more variable CoF functions to re-calculate or update the CoF. Downhole conditions associated with different depths are applied to the CoF in the corresponding discretized section of the modeled borehole, so that the CoF for the corresponding sections are updated, providing a CoF that can vary over lengths of the borehole. In one embodiment, in response to changes in downhole conditions measured in one or more discretized sections, the processor may automatically obtain the variable CoF functions of the changed conditions that were previously stored. The change in CoF is calculated based on the obtained or selected variable CoF functions, and the CoF in the discretized section or sections that experienced the change are re-calculated by raising or lowering the global CoF or the current CoF in each section.

For example, a change in the pumping rate will explicitly affect the temperature distribution and implicitly the CoF distribution along the well. Updating the CoF in real-time based on changing the operational conditions not only affects the real-time WOB, but also the modeled forces along the CT string. For instance, it is estimated that if the temperature range along the CT string is between 50 and 80° C., which is highly possible in most wells, the CoF may vary by as much as 40 to 50%. This leads to a large range of forces along the CT string affecting maximum depth and WOB. Finally real-time data on the actual WOB can be used to further improve the calculation of CoF.

The systems and methods described herein provide various advantages over prior art techniques. Improvement and/or optimization of an energy industry operation can be achieved using the tuned model and methods described herein, thereby increasing field competence and capability.

Embodiments described herein provide for operation models that accurately account for changes in the CoF over the course of an operation and changes along the length of a borehole during an operation. This is advantageous over current TFA software models, which currently consider constant coefficients that are estimated by users based on previous knowledge from similar wells.

A more accurate calculation of the CoF can lead to the optimization of the CT size, injector type, BHA geometry, the type and volume of chemicals, the pumping rate and CT speed schedule used for job design. Combined with a real-time CT software package such as Circa RT, this method could also calculate the CoF in real-time. With an updated CoF the real-time software package can more accurately provide the available weight on bit (WOB) and depth achievable for the current operation.

Generally, some of the teachings herein are reduced to an algorithm that is stored on machine-readable media. The algorithm is implemented by a computer or processor such as the processing unit 28 or the processing unit 66, and provides operators with desired output.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of planning and/or performing an energy industry operation, comprising:
   estimating a plurality of variable coefficient of friction (CoF) functions defining the variation of a CoF as a function of a downhole condition dependent on a selected operational parameter of an energy industry operation, the energy industry operation including deploying a carrier in a borehole in an earth formation, the carrier including a downhole component configured to perform the energy industry operation, each variable CoF function associated with a different value of the selected operational parameter, the energy industry operation being one of a drilling operation or a coiled tubing operation;
   defining a plurality of operational parameters related to the energy industry operation, including choosing a value of the selected operational parameter;
   controlling the energy industry operation, while the energy industry operation is performed, using a mathematical model of the energy industry operation, the mathematical model describing frictional forces between a surface of the carrier and a surface of the borehole and based on the plurality of operational parameters, the chosen value of the selected operational parameter and the downhole condition, wherein the model includes the CoF based on the variable CoF function associated with the chosen value;
   monitoring the energy industry operation while the energy industry operation is performed by collecting real time measurements while the energy industry operation is performed, the tuned mathematical model describing the frictional forces between the surface of the carrier and the surface of the borehole;
   tuning the mathematical model of the energy industry operation based on real time measurement data collected during the energy industry operation; and
   controlling the energy industry operation, while the energy industry operation is performed, using the tuned mathematical model.

2. The method of claim 1, further comprising performing the energy industry operation and evaluating the energy industry operation based on the mathematical model and a measurement performed during the energy industry operation.

3. The method of claim 1, the measurement data indicating a change of the downhole condition, wherein tuning the mathematical model of the energy industry operation comprises updating the model and the CoF based on the measurement indicating the change in the downhole condition.

4. The method of claim 1, wherein estimating the plurality of CoF functions includes simulating at least the selected operational parameter and downhole conditions using surface experiments, and measuring CoFs based on results of the experiments.

5. The method of claim 4, whereon the operation is a coiled tubing (CT) operation, and measuring the CoFs includes measuring sliding friction between the surface of the carrier of the CT operation and the surface of the borehole.

6. The method of claim 1, wherein the model includes discretizing sections of the borehole based on temperature information, a CoF being assigned to each discretized section, each CoF being individually adjustable based on local changes in the downhole condition.

7. The method of claim 1, wherein the downhole condition is a local downhole temperature.

8. The method of claim 1, wherein the selected operational parameter includes lubrication employed during the operation, each value of the parameter corresponding to a different type of lubricant.

9. The method of claim 1, wherein the carrier includes a coiled tubing borehole string.

10. A system for planning and/or performing an energy industry operation, comprising:
   a carrier configured to be disposed in a borehole in an earth formation, the carrier including a downhole component configured to perform the energy industry operation based on a plurality of operational parameters, the energy industry operation being one of a drilling operation or a coiled tubing operation;
   at least one sensing device configured to measure a downhole condition during the energy industry operation; and
   a processor configured to receive a plurality of defined operational parameters related to the energy industry operation, the plurality of operational parameters including a chosen value of a selected operational parameter, the processor configured to perform:
      estimating a plurality of variable coefficient of friction (CoF) functions defining the variation of a CoF as a function of a downhole condition dependent on the selected operational parameter of the energy industry operation, each variable CoF function associated with a different value of the selected operational parameter;
      controlling the energy industry operation, while the energy industry operation is performed, using a mathematical model of the energy industry operation, the mathematical model describing frictional forces between a surface of the carrier and a surface of the borehole and based on the plurality of operational parameters, the chosen value of the selected operational parameter and the downhole condition, wherein the model includes the CoF based on the variable CoF function associated with the chosen value;

monitoring the energy industry operation while the energy industry operation is performed by collecting real time measurements while the energy industry operation is performed, the tuned mathematical model describing the frictional forces between the surface of the carrier and the surface of the borehole;

tuning the mathematical model of the energy industry operation based on real time measurement data collected during the energy industry operation; and controlling the energy industry operation, while the energy industry operation is performed, using the tuned mathematical model.

11. The system of claim 10, wherein the process is configured to evaluate the energy industry operation based on the mathematical model and a measurement received from the at least one sensing device during the energy industry operation.

12. The system of claim 11, wherein the processor is configured to collect the measurement data from the at least one sensing device, the measurement data indicating a change of the downhole condition, and wherein tuning the mathematical model of the energy industry operation comprises update the model and the CoF in real time based on the measurement indicating the change in the downhole condition.

13. The system of claim 10, wherein the plurality of CoF functions are estimated based on experimental results received by the processor, the experimental results provided by surface experiments that simulate at least the selected operational parameter and downhole conditions, the experimental results indicating a relationship between the variation of the CoF and changes in the downhole condition and the selected operational parameter.

14. The system of claim 13, whereon the operation is a coiled tubing (CT) operation, and the variation in the CoF is based at least in part on sliding friction between the surface of the carrier of the CT operation and the surface of the borehole.

15. The system of claim 10, wherein generating the model includes discretizing sections of the borehole based on temperature information, a CoF being assigned to each discretized section, each CoF being individually adjustable based on local changes in the downhole condition.

16. The system of claim 10, wherein the downhole condition is a local downhole temperature.

17. The system of claim 10, wherein the carrier includes a drilling assembly.

18. The system of claim 11, wherein the carrier includes a coiled tubing borehole string.

* * * * *